United States Patent

[11] 3,547,144

| [72] | Inventor | John W. Mullins<br>P.O. Box 20524, Oklahoma City, Okla. 73120 |
|---|---|---|
| [21] | Appl. No. | 755,204 |
| [22] | Filed | Aug. 26, 1968 |
| [45] | Patented | Dec. 15, 1970 |

[54] SERVICE VALVE
3 Claims, 4 Drawing Figs.

[52] U.S. Cl. .................................................... 137/318, 285/199
[51] Int. Cl. .................................................... F16k 43/02
[50] Field of Search.......................................... 137/223, 231, 232, 234.5, 316, 317, 318; 77/37—42; 285/197, 198, 199

[56] References Cited
UNITED STATES PATENTS

| 204,730 | 6/1878 | Hawkes...................... | 285/197X |
| 444,235 | 1/1891 | McHugh...................... | 285/197 |
| 3,115,889 | 12/1963 | Franck et al................. | 137/318 |
| 3,162,211 | 12/1964 | Barusch...................... | 137/318 |
| 3,428,075 | 2/1969 | Wagner....................... | 137/318 |

*Primary Examiner*—William F. O'Dea
*Assistant Examiner*—David R. Matthews
*Attorney*—Robert K. Rhea ABSTRACT: A substantially cylindrical valve housing having an air valve closed central gas passageway is provided with a coaxial line piercing tip at one end. Clamp means, releaseably engageable with the housing, transversely contacts a peripheral portion of a line to be tapped and forces the line piercing tip of the housing into the line.

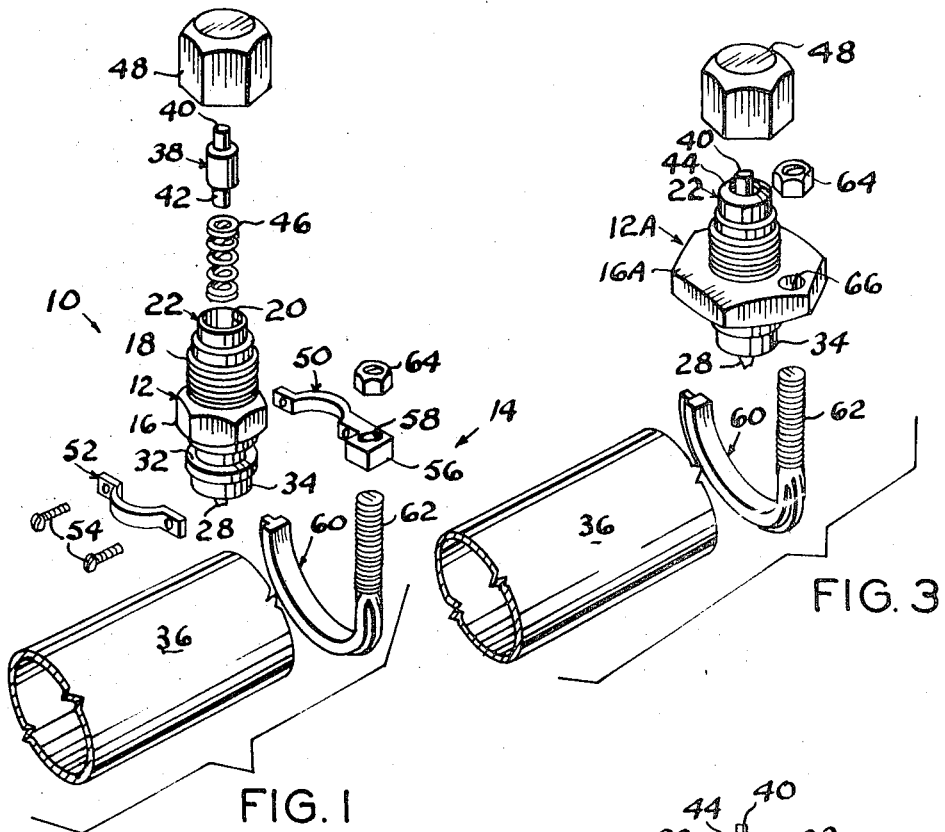
FIG. 1
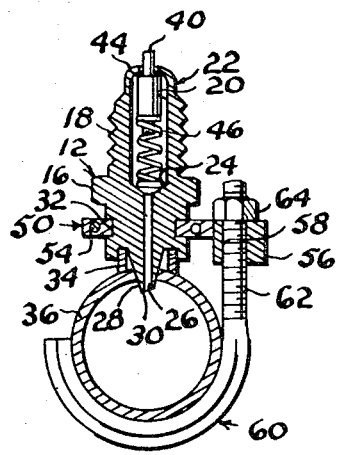
FIG. 2
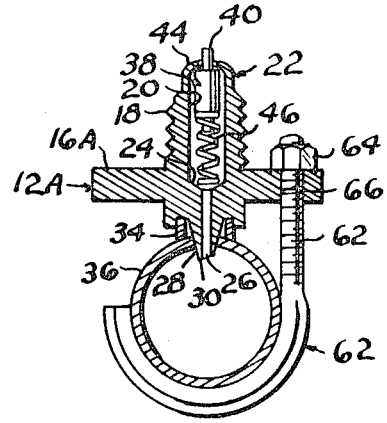
FIG. 3
FIG. 4
JOHN W. MULLINS
INVENTOR.
BY Robert K. Rhea
AGENT

ß,547,144

1

SERVICE VALVE

BACKGROUND OF THE INVENTION

The present invention relates to service valves and more particularly to a refrigerant line piercing valve housing and clamp means for positioning the housing on a line to be tapped.

It is desirable and frequently necessary to connect a valve housing to a refrigerant conductor line for adding or removing refrigerant gas. Various types of valve housings for connection with a refrigerant line have been proposed, the most of which comprise a clamping means which becomes a permanent part of the line.

This invention provides a valve housing and clamping means which forces a piercing tip of the valve housing into the line as a means for permanently connecting the valve housing to the line. Thereafter the clamp means may be removed and used in a different location.

Most valve housings of this class, as shown by the prior art, are formed of steel whereas the refrigerant conducting line is formed from copper tubing. Brazing a steel housing to a copper line requires a relatively high temperature which is undesirable in refrigerant systems in that the high temperature damages the refrigerant gas.

The valve housing of this invention is provided with a previously connected soft copper tube surrounding its line piercing end portion which is forced against the periphery of the line to be tapped during the line tapping operation and may thereafter be soldered to the line at a relatively low temperature.

SUMMARY OF THE INVENTION

A substantially cylindrical valve housing having a central bore is provided at one end portion with a line piercing tip. The bore forms a gas passageway which is closed by a spring urged valve. A relatively short copper tube surrounds the line piercing tip and is connected at one end to the valve housing. Arcuate clamp members, cooperatively received by a peripheral groove formed in the housing, is provided with an apertured laterally projecting end portion. A J-shaped hook, having a threaded stem slidably received by the clamp aperture, transversely surrounds a line to be tapped and forces the line piercing tip of the housing into a line. The short copper tube is then soldered to the line.

The principal object of this invention is to provide a valve housing having a line piercing tip and clamp means removably engageable with the housing for forcing the line piercing tip into a line to be tapped.

BRIEF DESCRIPTION OF THE DRAWINGS

FIG. 1 is an exploded perspective view of a preferred form of the device;

FIG. 2 is a vertical cross-sectional view, partially in elevation, of the device shown by FIG. 1 when assembled on a line;

FIG. 3 is an exploded perspective view of an alternative embodiment of the device; and, FIG. 4 is a vertical cross-sectional view, partially in elevation, of the device of FIG. 3 when assembled on a line.

DESCRIPTION OF THE PREFERRED EMBODIMENTS

Like characters of reference designate like parts in those FIGS. of the drawings in which they occur.

In the drawings:

Referring more particularly to FIGS. 1 and 2, the reference numeral 10 indicates the device, as a whole, comprising a valve housing 12 and clamping means 14. The valve housing 12 is cylindrical in general configuration having a hexagonal head 16 intermediate its ends and threads 18 at one end portion. The housing is centrally bored, as at 20, and diametrically reduced outwardly of its threads 18 to form a relatively thin wall 22 for the purposes presently explained.

2

The housing bore is diametrically reduced intermediate the ends of the housing to form an annular shoulder 24 and define a smaller diameter bore 26. The end of the housing opposite the threaded end 18 terminates in an inverted truncated conical-shape, of reduced diameter, to form a line piercing pin or tip 28 having a beveled cutting surface 30. The periphery of the housing wall between the head 16 and tip 28 is provided with an annular groove 32 for the purposes presently explained.

A relatively short length of soft copper tubing 34 surrounds the tip 28 and is connected, at one end, with the housing 12, within a suitable recess surrounding the base of the conical-shaped tip 28, for soldering the other end of the tubing 34 to a refrigerant line 36, or the like, as hereinafter explained.

The housing bore 20 coaxially receives a cylindrical like steel valve 38. The valve 38 is characterized by diametrically reduced end mandrels or stems 40 and 42 projecting coaxially outward of its respective ends. The valve 38 is inserted into the housing bore 20 and the free end edge of the thin wall 22 is deformed or rolled inwardly, as at 44, to form an opening loosely surrounding the valve stem 40, as shown more clearly in FIGS. 2, 3 and 4, diametrically smaller than the diameter of the intermediate portion of the steel valve 38. The inner surface of the rolled in end portion 44 thus forms a seat for the upwardly disposed end portion of the valve 38. A helical spring 46 is interposed between the housing seat 24 and the valve 38 in surrounding relation, at one end portion, of the stem 42 prior to insertion of the valve 38. The spring 46 thus normally maintains the valve 38 seated against the rolled wall 44 to close the gas passageway while the outwardly projecting free end of the stem 40 permits the gas passageway to be opened by pressure applied to the free end of the stem 40. The rolling over or bending in of the free end of the housing wall 22 is accomplished by engaging a dust cap 48, or the like, with the housing threads 18 wherein the inner end surface of the dust cap contacts the free end surface of the housing wall 22 to roll or turn it inwardly.

The clamp means 14 comprises a pair of substantially semicircular-shaped bands 50 and 52, formed on a radius and width complemental with respect to the housing groove 32 and each having alignedly bored laterally extending end portions for receiving screws 54, or the like, to secure the members 50 and 52 within the housing groove 32. One end portion of the clamp member 50 is extended and enlarged to form a lug 56 having an aperture or opening 58 parallel with respect to the longitudinal axis of the housing 12. A substantially J-shaped hook 60, formed on a radius complemental with respect to the outside diameter of the largest line 36 to be tapped, transversely surrounds a peripheral portion of the line. The hook 60 is provided with a threaded stem portion 62 which is slidably received by the lug aperture 58. A nut 64 engages the threads of the stem 62 and when tightened, pulls the valve housing 12 toward the line by the assembled clamp members 50 and 52 so that the tip 28 pierces the wall of the line 36. The nut 64 is tightened until the free end of the short tube 34 contacts the surface of the line 36. The tube 34 may then be soldered to the line 36 and the clamp means 14 removed from the line and housing. Since the tube 34 is formed of similar material having substantially the same wall thickness as the line 36, the soldering step may be accomplished at a considerably lower temperature than that required for soldering the adjacent portion of the housing 12 to the line 36. Alternatively, the clamp means may be left in place if desired.

Referring now to FIGS. 3 and 4, an alternative embodiment of the housing is illustrated at 12A which is substantially identically formed with respect to the housing 12 with the exceptions that the groove 32 is omitted and the head portion 16A is formed from greater diameter stock so that the head 16A forms an outstanding hexagonal-shaped flange. This flanged head is provided with an aperture 66 on an axis parallel with respect to the longitudinal axis of the housing for slidable reception of the threaded stem 62 of the J-shaped hook 60 so that when the nut 64 is tightened the housing 12A is connected with the line 36 as explained hereinabove for the housing 12. Similarly the J-shaped hook may remain connected with the line and flanged head 16A or removed after soldering the short tube 34 to the line 36.

I claim:

1. A line tapping service valve, comprising: a substantially cylindrical valve housing having a line piercing tip at one end portion, said housing having a polygonal head intermediate its ends forming an outstanding flange, said flange having a transverse aperture; and clamp means including a J-shaped hook having a nut threadedly engaged with one end portion, said hook transversely surrounding a peripheral portion of a line to be tapped and slidably received by its threaded end portion, within the aperture in said flange for forcing the line piercing tip into the line.

2. Structure as specified in claim 1 and further including a relatively short tube surrounding the line piercing tip and connected, at one end, with the adjacent end portion of said housing.

3. Structure as specified in claim 2 in which said housing is centrally bored and provided with an annular shoulder intermediate its ends; a cylindrical valve having a diametrically reduced coaxial stem portion, at each of its ends, coaxially received by the bore of said housing opposite said tip; and a helical spring interposed between said valve and said annular shoulder, said housing having a diametrically reduced end portion opposite said tip forming a relatively thin wall, the free end portion of said thin wall being turned arcuately inward and forming a seat for sealing with said valve.